Sept. 5, 1939.   E. E. LONGLEY   2,172,026
AUTOMATIC GOVERNOR FOR INTERNAL COMBUSTION ENGINES USED
FOR DRIVING ELECTRIC ARC WELDING GENERATORS
Filed June 1, 1938
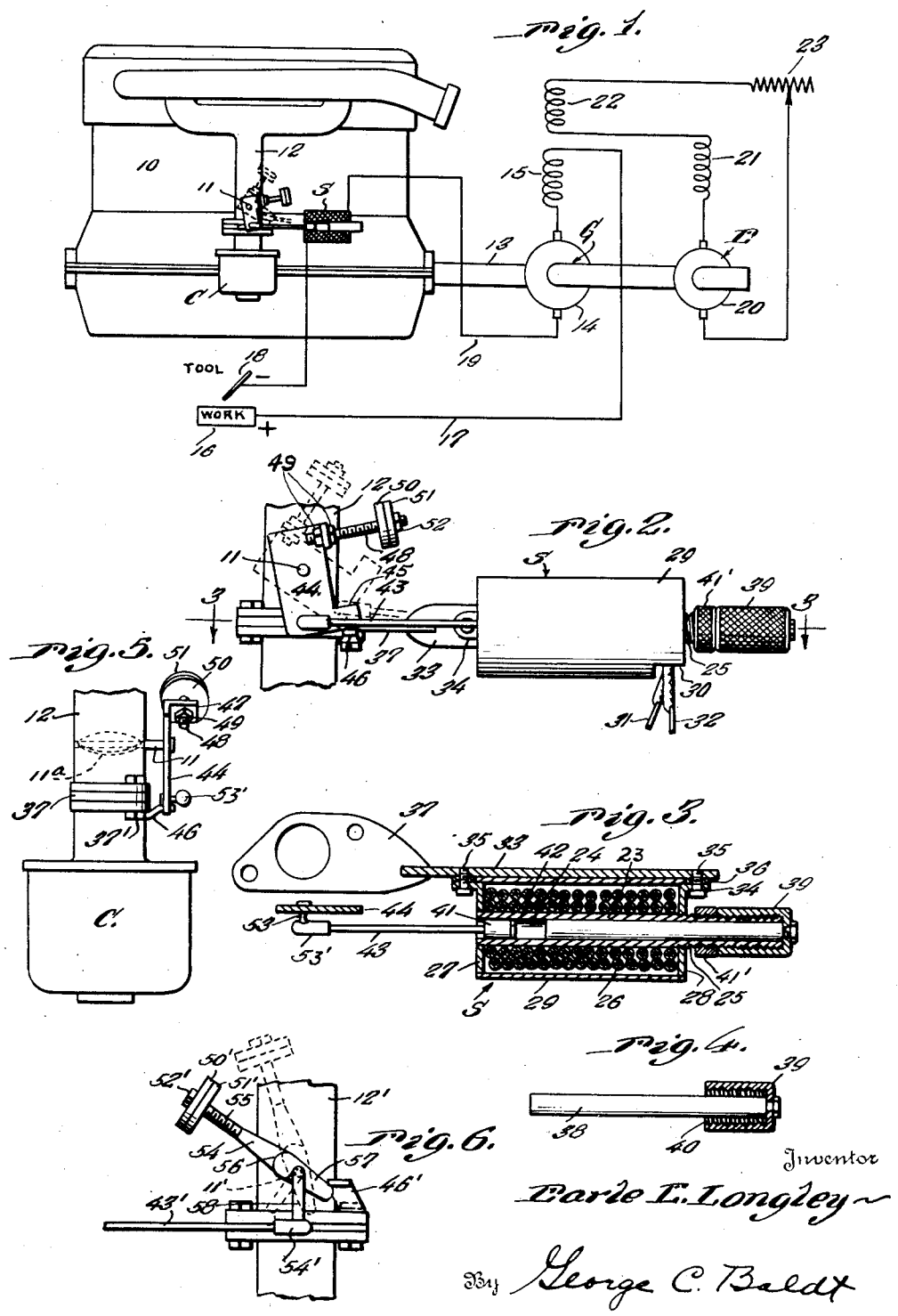

Patented Sept. 5, 1939

2,172,026

UNITED STATES PATENT OFFICE 2,172,026

AUTOMATIC GOVERNOR FOR INTERNAL COMBUSTION ENGINES USED FOR DRIVING ELECTRIC ARC WELDING GENERATORS

Earle Edwin Longley, New Orleans, La.

Application June 1, 1938, Serial No. 211,253

2 Claims. (Cl. 290—40)

This invention relates to an automatic governor for internal combustion engines that drive an electric generator, and particularly to an automatic governor to control the speed of the engine used to drive an electric generator in portable electric arc welding equipment.

The customary outfit of this nature comprises an internal combustion engine having an electric generator connected directly, or by other suitable indirect connections such as gears or pulleys and belts, to the drive shaft of the engine, and the unit is generally mounted on a vehicle such as a portable truck or an automobile. In the present instance, the generator is suitably connected in an electric circuit to supply an electric current to the welding electrodes equipped for arc welding, where the work to be welded forms the positive electrode and the manually operated carbon electrode or metal rod forms the negative electrode.

In such equipment it is desirable to permit the engine to idle during such times as the operator is not actually welding with the outfit, as for example, when the operator is changing electrodes or making adjustments to the work. It often happens that it is impracticable for the operator to walk back and forth from the work to the location of the engine to make an adjustment to reduce the engine speed unless it is the intention to cease the welding operation for a considerable period of time. Many times during the day's work the engine is running full speed while there is no welding being done and this is not only a waste of fuel but a considerable burden on the equipment all of which amounts to quite an item in the expense of welding. It is therefore the primary object of the invention to devise a remotely controlled governor for the engine which will operate automatically to reduce the speed of the engine to idling speed while no welding is being done; and which governor will automatically function to increase the speed of the engine and increase the current values upon an application of the welding current.

I am aware of prior inventions that accomplish the same purpose, but in those known devices it is necessary to use expensive and delicate electrical equipment to regulate the current values. It is another important feature of the present invention to use a mechanical regulator for current values in conjunction with the governor which is positive in operation, simple and easy to adjust, and as compared to known electrical regulators is inexpensive to manufacture, install, and use.

Further objects of the invention are to provide a device of the character referred to which is strong, compact, and durable, thoroughly reliable for its intended purpose, and that has relatively few working parts that are likely to become worn and require repair.

With the foregoing and other objects in view, the invention consists of a novel combination, construction, and arrangement of parts as will be hereinafter more specifically described in the specification and illustrated in the accompanying drawing, but it is to be understood that changes, variations, and modifications may be resorted to without departing from the spirit of the claims hereunto appended.

In the drawing wherein is shown the preferred embodiment of the invention and wherein like characters of reference indicate like parts throughout the several views:

Figure 1 is a side elevation of an internal combustion engine showing the invention applied thereto and showing the electric wiring diagram of the electric circuit.

Figure 2 is an enlarged fragmentary side elevation of the engine with the automatic governor attached thereto with the governor removed from the electric circuit and showing the parts in the idling speed position.

Figure 3 is a horizontal section in detail taken substantially on the plane of line 3—3 of Figure 2 and looking in the direction of the arrows.

Figure 4 is a side elevation partly broken away of the load speed position regulator member removed from the solenoid.

Figure 5 is a front elevation of a fragmentary portion of the internal combustion engine taken at right angles to Figure 2 and having the solenoid removed.

Figure 6 is a fragmentary side elevation of a portion of the internal combustion engine showing a modified form of the rocking member applied thereto.

I apply my invention to any internal combustion engine of the proper power rating selected in accordance with the current output of the generator to be used with the unit. The generator driven by the engine is compound wound and is designed for a current capacity for electric arc welding of a general class. I have found it most feasible to construct these outfits in separate units having a current capacity of 100, 150, 200, 300, and 500 amperes since each unit may be used to advantage for general classes of welding requiring these current outputs. In this character of generator, and in my generators used in this invention, they are constructed with the regulation exciter designed for use with the current requirements of the generator in arc welding. I also wish to call attention to the fact that the generator in my unit is set to its maximum capacity, and after it has once been set no further adjustment is necessary because the current load for the welding operation is changed by the operator by the regulator on the present invention.

In the drawing, 10 indicates an internal combustion engine having a carburetor C and a throttle valve 11a operated by the shaft 11. The throttle valve controls the admission of the fuel charge into the intake manifold 12 of the engine. The throttle valve is the customary butterfly type which is fixed to the shaft 11 and the shaft is journalled in the intake manifold 12. As will presently appear, the throttle valve 11a will have only two positions in the operation of the present invention. One position will be idling speed position shown in Figure 5, with operating parts shown in full lines in Figures 1, 2, 3 and 6 of the drawing; and the other will be the load speed position indicated by the parts in dotted lines in Figures 1, 2 and 6 of the drawing. While I have shown the invention associated with an engine having an up-draft carburetor, it may be applied to down-draft carburetors with equal results by those skilled in the art.

Connected directly to the drive shaft 13 of the engine to be rotated simultaneously therewith is the electric current generator G and the exciter E. Although I have shown the generator and exciter connected directly to the drive shaft, any manner of connecting them with the drive shaft may be used as long as the engine is used to drive them. For example, the generator and exciter may be mounted on the one shaft and this shaft may be driven from the drive shaft by transmission gears, or a belt and pulley connection.

The welding generator G comprises an armature 14 and a series main field winding 15 which are connected by the electric conducting wire 17 to the work 16 to supply electric welding current. The work 16 forms the positive electrode. The negative electrode is indicated at 18 and it may be a metal rod in metal arc welding, or a carbon rod in carbon arc welding. The negative electrode is manipulated by the operator to strike or break the arc. In the line or conductor 19 connecting the generator G and the electrode 18 there is a solenoid S which is connected in series circuit relation with the generator. This solenoid is energized when the circuit is closed and de-energized when the circuit is open.

The exciter E is provided with an armature 20 and a series field winding 21 which are connected to the auxiliary field winding 22 to supply exciting current to the generator G when the work circuit is open. A rheostat 23 is connected in series circuit relation with the main field winding 21 and armature 20 to regulate the current flow in the auxiliary field winding 22 of the generator G.

Solenoid S is of cylindrical shape and is supported with its axis in a horizontal position. The solenoid is made with a central brass tube or sleeve 23 the interior of which forms a circular chamber 24. An end portion 25 of the sleeve is threaded. A coil 26 of electrical conducting material, such as wire, is wound around the major portion of the sleeve and the coil is preferably made with two layers as shown in Figure 3. A head 27 is fixed in any manner, as by soldering, on one end of the sleeve. Another head 28 is likewise fixed to an intermediate portion of the sleeve allowing the threaded portion 25 to extend outwardly of the head. Secured to the peripheries of the heads 27—28 and surrounding the coil 26 is a sheet metal cover 29. The coil is positioned between the heads, is supported by the sleeve, and is enclosed by the cover except for the opening 30 through which the terminals of the conductor wires of the coil extend. The terminals indicated at 31—32 are connected with the line 19 of the welding circuit, as shown in Figure 1. Thus it will be seen that the chamber 24 lies in the field of magnetic force created by the electric current traversing coil 26 when the welding circuit is closed.

A flat bar 33 supports the solenoid S. On each head 27—28 is an outset perforated lug 34 which receives a screw 35 which anchors in the bar. Between the bar and each lug is a washer 36 embracing the shank of the screw. The flat bar is made of metal and is preferably formed integral with an adapter plate 37 which is bolted at 37' between the flange on the carburetor C and the flange on the intake manifold 12 as shown.

The manually operated regulator consists of a cylindrical metal rod or plunger 38 made of steel or other metal which slides in a portion of chamber 24. The outer portion of the plunger is fixed to the crown of a cap 39 threaded at 40 on the inside to engage the threaded portion 25 of the sleeve. There is also a threaded lock collar 41' engaging the threaded portion 25 of the sleeve which when turned in the proper direction abuts the edge of cap 39 and locks the plunger 38 of the regulator in any desired adjusted position in the chamber 24.

A magnetically responsive cylindrical iron core or armature 41 is slidably mounted in the inner portion of chamber 24 of the sleeve 23. There is sufficient clearance between the wall of the sleeve and the core to permit enough rocking movement axially of the core to accommodate the angular displacement of the connecting rod to be presently described. On one end of the core is fixed a layer of brass 42 that prevents the plunger 38 and the core from sticking fast when they touch under welding load conditions. When the coil 26 is energized by closing the welding circuit, the core 41 is drawn to the right, from the idling speed position as shown in Figure 3, until it abuts the end of regulator plunger 38. To the other end of the core 41 is fixed the one end of a connecting rod 43.

A rocker member swings the throttle valve from the idling speed position to load speed position and back to idling speed position automatically. In the form of the rocker member shown in Figures 1 to 5, the same includes a substantially flat rectangular metal plate 44, fixed at its center to the throttle valve shaft 11. On one corner of the plate 44 is an extension 45 which engages a stop 46 secured by one of the flange bolts 37'. The extension strikes the stop 46 and limits the idling position of throttle valve. On the opposite corner of the plate 44 is an outset ear 47 which extends at right angles to the plate. An elongated threaded stem 48 is mounted on the lug or ear 47 by having the lower end thereof extending through an opening in the ear and having a pair of nuts 49 embracing the stem and bearing one on each face of the ear. On the outer end of the stem is a nut 52 which limits the movement of a pair of threaded rings 50—51 which are also carried by the stem and these rings may be locked in any desired position on the stem by turning them in the opposite direction. These rings are counterbalance weights and normally retract the throttle valve to idling position when the solenoid is de-energized. Near one end of the plate 44 is fastened a ball stud 53 which is connected to the outer end of the connecting rod 43 by a universal connection or joint 53' which allows sufficient play in the joint to permit plate 44 of the rocker member to swing.

In the form of the invention shown in Figure 6, the rocker member consists of an upper or outer stem portion 54 threaded on the outer end at 55 to receive the weighted rings 50'—51' and the nut 52', which rings and nut are the same as shown and described in the first form of the rocker member described. The lower end of the stem portion 54 merges with a laterally offset horizontal part 56 and this part in turn merges with a depending finger 57 the free end of which abuts a stop 46' similar to the stop 46. The throttle valve shaft 11' is secured to the inside of finger 57 so as to turn the shaft when the rocker member swings. Fixed to the outside of the finger 57 is a depending arm 58 which is joined to the connecting rod 43' by a universal coupling 54' similar in all respects to the coupling 53'.

The operation of the invention will be explained from the stage where the throttle valve 11a is normally in the idling speed position and the engine is rotating slowly with the work circuit open and the solenoid S is de-energized. This stage is illustrated by the full line position of the parts in the drawing. When the operator wishes to make a weld he draws the tool or negative electrode 18 over the work or positive electrode 16. This closes the work circuit and energizes the solenoid S whereupon the core 41 is drawn into the chamber 24 until it abuts the end of the plunger 38 of the regulator. The movement of the core shifts the throttle valve against the force of the weights 50—51 or 50'—51' to load speed position which action accelerates the engine to drive the generator at the current load determined by the position at which the core abuts the end of the plunger 38.

The engine will operate under the load speed as long as the operator is welding. When the welding arc is broken, solenoid S is de-energized whereupon the weights 50—51 or 50'—51' swing the throttle valve to the idling speed position and the engine runs at idling speed until another welding arc is struck. It will be seen that the interval of time required by the parts to return to idling speed position from the load speed position may be varied within certain limits by changing the position of the weights 50—51 or 50'—51' with respect to the lengths of the stems 48 or 54 respectively. Furthermore, the load speed of the engine which controls the current output of the generator G may also be varied by the operator by moving the regulator plunger 38 and locking the same in any desired position so as to lengthen or shorten the stroke of the solenoid core 41. It is also pointed out that the universal couplings 53' or 54' supply sufficient play so as to provide for slight misalignments of the operating parts frequently met in applying the invention to different types of engines.

Having described my invention, what I claim is:

1. An electric governor for controlling an internal combustion engine arranged to drive an electric generator for arc welding circuits wherein the internal combustion engine includes a throttle valve for controlling the speed of the engine operatively connected with a shaft and said shaft having a normal idling speed position and a load speed position characterized by an elongated member having an intermediate portion fixed to the shaft for rocking the shaft, a solenoid including a coil having the windings thereof connected with the generator circuit, a magnetically responsive core mounted to move in the coil and connected with a second portion of said member for biasing said shaft from normal idling speed position to load speed position when the generator circuit is closed, adjustable means carried by the solenoid and coacting with the core to limit the movement of the core in one direction and thereby regulate the load speed position of the shaft, and adjustable counterweights carried by a third portion of said member to vary the time interval required for the shaft to return from load speed position to normal idling speed position when the generator circuit is opened.

2. An electric governor for controlling an internal combustion engine arranged to drive an electric generator for arc welding circuits wherein the internal combustion engine includes a throttle valve controlling the speed of the engine operatively connected with a shaft and said shaft having a normal idling speed position and a load speed position characterized by an elongated sleeve externally threaded at one end, a coil of electric conducting material wound on the sleeve adjacent the threaded end portion and connected with the generator circuit, a magnetically responsive core mounted to move in a portion of the sleeve and connected with the shaft for biasing the shaft from normal idling speed position to load speed position when the generator circuit is closed, a plunger disposed in another portion of the sleeve in the path of the core to limit the movement of the core in one direction, a cap on the plunger provided with threads engageable with the threads on the end of the sleeve to provide for adjusting the plunger and thereby regulate the load speed position of the shaft, a collar mounted on the threaded portion of the sleeve and coacting with the cap to lock the plunger in adjusted position, and adjustable means connected with the shaft to vary the time interval required for the shaft to return from the load speed position to the normal idling speed position when the generator circuit is opened.

EARLE EDWIN LONGLEY.